(12) United States Patent
Mellon et al.

(10) Patent No.: US 6,464,214 B1
(45) Date of Patent: Oct. 15, 2002

(54) ANTI-VIBRATION MOUNTING FOR CLIP-FIT CONNECTION MEANS AND VEHICLE FITTED WITH THIS MOUNTING

(75) Inventors: Paul Mellon, Grand Rapids, MI (US); Hamid Dehestani, Grand Rapids, MI (US); Matt Alferink, Midleville, MI (US); Larmie Hamilton, Byron Center, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 09/657,240

(22) Filed: Sep. 7, 2000

(51) Int. Cl.[7] .................................................. F16F 7/00
(52) U.S. Cl. ..................... 267/141.2; 267/220; 403/326
(58) Field of Search ........................... 267/153, 140.12, 267/141.2, 219, 220, 141; 403/316, 317, 318, 326, 329, 408.1

(56) References Cited

U.S. PATENT DOCUMENTS

| | | | | |
|---|---|---|---|---|
| 1,830,118 A | * | 11/1931 | Loro ........................ | 267/141.2 |
| 3,531,144 A | * | 9/1970 | Bizilia ........................ | 403/326 |
| 5,076,725 A | * | 12/1991 | Nakaura ................... | 267/141.2 |
| 5,261,850 A | * | 11/1993 | Hein .......................... | 267/220 |
| 5,310,276 A | * | 5/1994 | Bergers et al. ............. | 403/349 |
| 6,062,763 A | * | 5/2000 | Sirois et al. ................ | 403/326 |

FOREIGN PATENT DOCUMENTS

DE    44 17 651 C1    10/1995

* cited by examiner

*Primary Examiner*—Matthew C Graham
(74) *Attorney, Agent, or Firm*—Marshall, Gerstein & Borun.

(57) ABSTRACT

An anti-vibration mounting comprises first and second rigid frames, which can be joined respectively to two rigid elements to be connected, an elastomer body connecting the two frames to one another and being designed to support a permanent axial load along a first axis, the elastomer body being joined to a sleeve fitted onto a mounting bar belonging to the first frame and extending along a second axis substantially perpendicular to the first axis. The sleeve is retained on the mounting bar by a clip-fit connection.

11 Claims, 3 Drawing Sheets

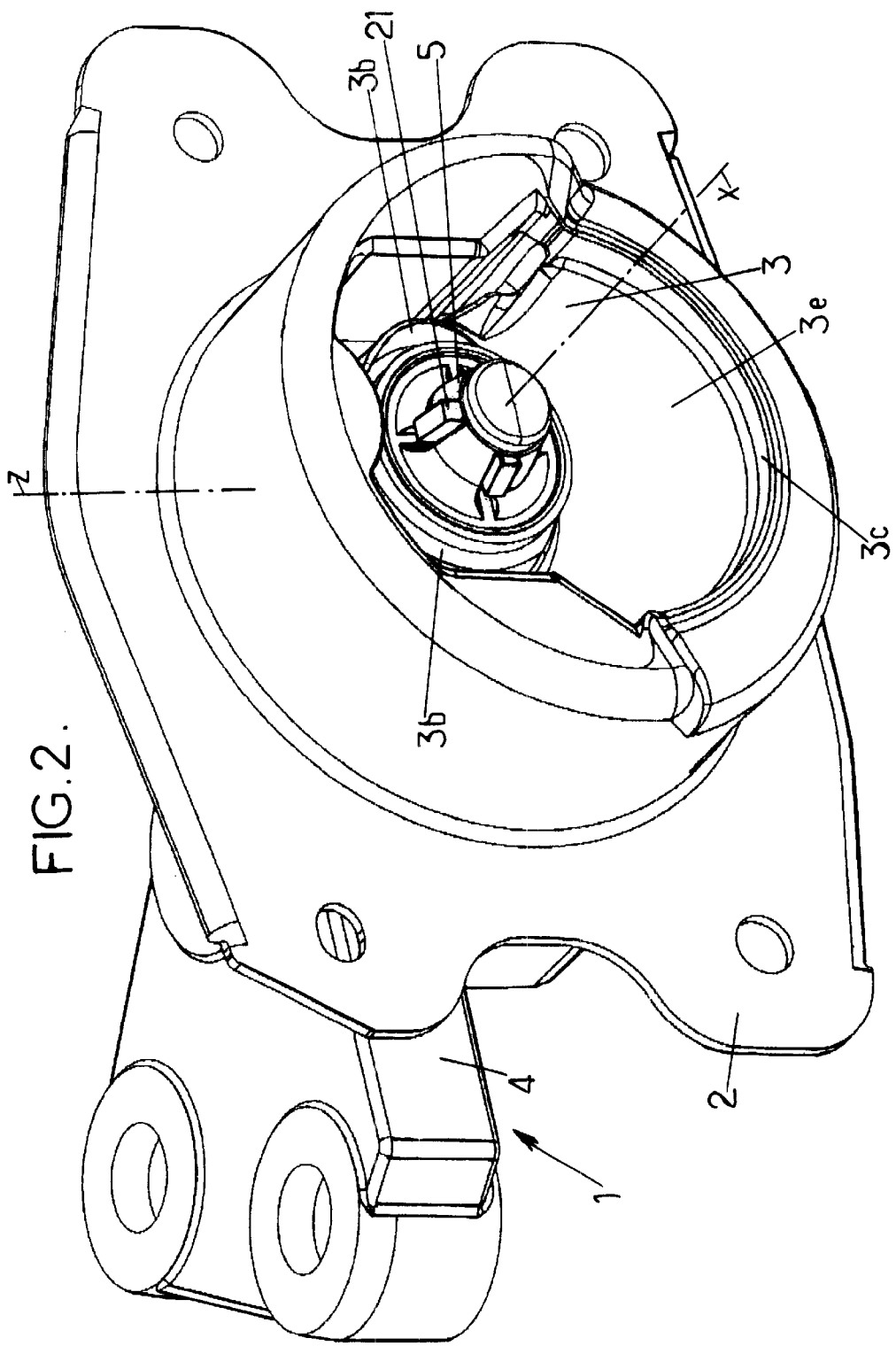

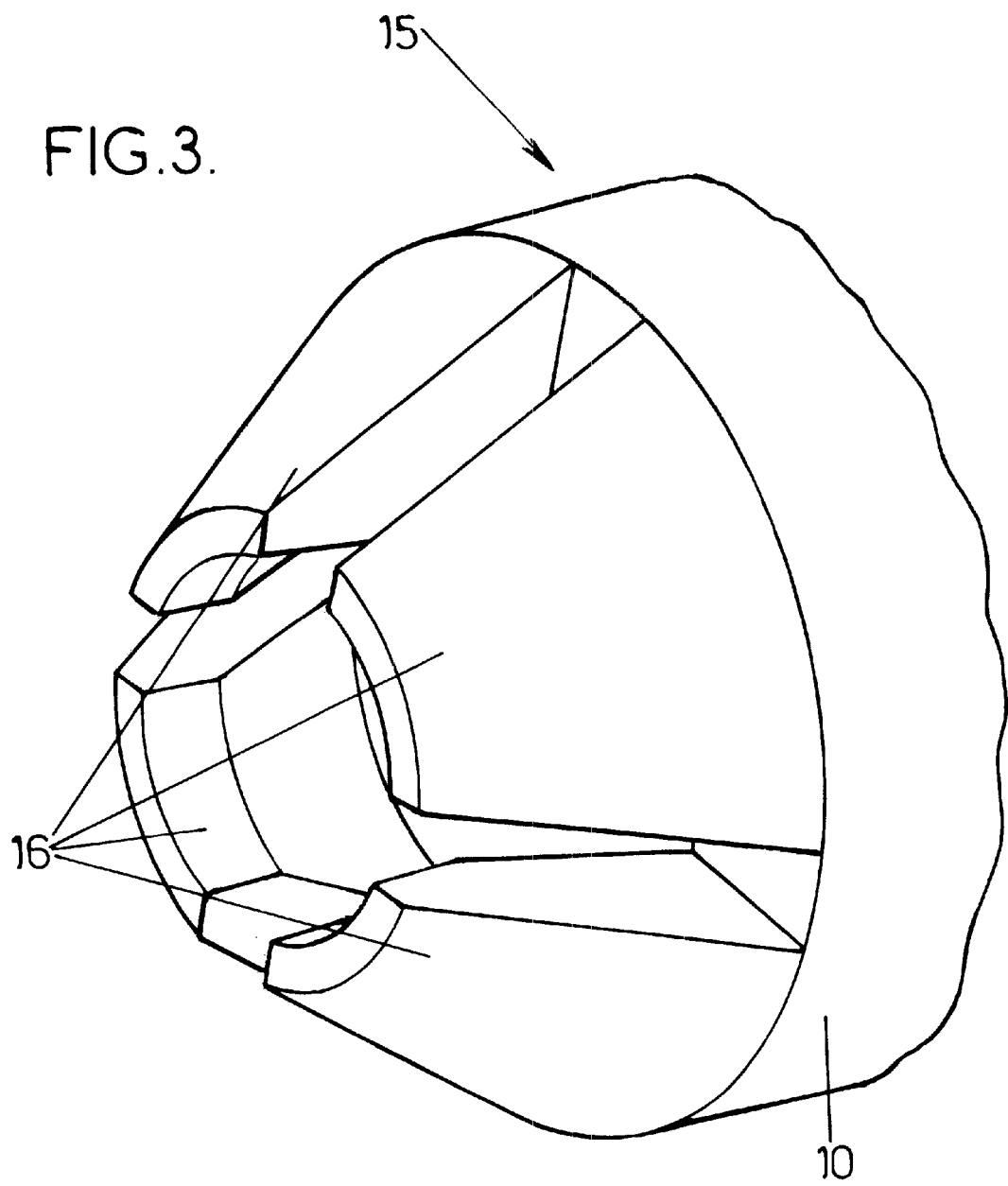

ANTI-VIBRATION MOUNTING FOR CLIP-FIT CONNECTION MEANS AND VEHICLE FITTED WITH THIS MOUNTING

FIELD OF THE INVENTION

The present invention relates to anti-vibration mountings having a clip-fit connection means and vehicles fitted with such mountings.

Of the various types of anti-vibration mountings, the invention more specifically relates to those which have first and second rigid frames, which can be joined respectively to two rigid elements to be connected, an elastomer body linking the two frames to one another and being designed to support a permanent axial load along a first axis, the elastomer body being joined to a sleeve fitted on a mounting bar belonging to the first frame and extending along a second axis substantially perpendicular to the first axis.

BACKGROUND OF THE INVENTION

In known devices of this type, the mounting bar is generally inserted by force inside a sleeve, the interior of which is lined with elastomer. Due to the friction caused by movement when the mounting bar is inserted in the sleeve, antagonistic forces occur (known as spring back) which have a tendency to allow movement relative to the central axis inside its bore, which causes these components to become incorrectly positioned and, in extreme cases, may lead to uncoupling from the central axis of its mounting. The forces produced during dismantling are much lower than those applied when assembling the components.

In order to limit this risk, the mountings known from the prior art are made with severe manufacturing tolerances, which on the one hand affect the cost of manufacturing these components and on the other lead to a more limited permissible load.

OBJECTS AND SUMMARY OF THE INVENTION

Accordingly, the objective of the present invention is to alleviate the drawbacks of the solutions known from the prior art by proposing an anti-vibration mounting which makes it virtually impossible to uncouple the sleeve relative to the mounting bar, the mechanical assembly between the first element and the second element also being provided by connecting means of a simple design which is easy to produce at a lesser cost using mass production techniques.

To this end, the anti-vibration mounting proposed by the invention is characterised in that the sleeve is retained on the bar by a clip-fit connection.

One and/or the other of the following features may be incorporated in advantageous embodiments:

the sleeve has an end piece of a truncated cone shape provided with a plurality of flexible tabs which clip onto the mounting bar;

the free ends of the flexible tabs abut against a projection protruding radially relative to the mounting bar;

there are at least three flexible tabs;

there are four flexible tabs;

the sleeve is made from a plastics material;

the plastics sleeve is reinforced by a metal insert;

the elastomer body has zones forming stops along the first axis and in a direction perpendicular to the first and second axes in order to restrict the extent of relative movements between the first and second frames;

a ridge manufactured in one piece with the mounting bar fits between each flexible tab, avoiding any rotary movement between the first and second frames;

the elastomer body is surrounded by the second frame.

The invention also relates to a motor vehicle having an engine joined to a body by at least one anti-vibration mounting of the type outlined above, the first axis being vertical and the second axis being horizontal.

BRIEF DESCRIPTION OF THE DRAWINGS.

Other features and advantages of the invention will become clear from the description below, and with reference to the drawings, which illustrate an example of an embodiment, although this is not restrictive in any respect.

Of the drawings:

FIG. 2 is a perspective view of an antivibration mounting as proposed by the invention;

FIG. 3 is a perspective view showing a detail of part of the mounting illustrated in FIG. 2.

MORE DETAILED DESCRIPTION

Figure 1:
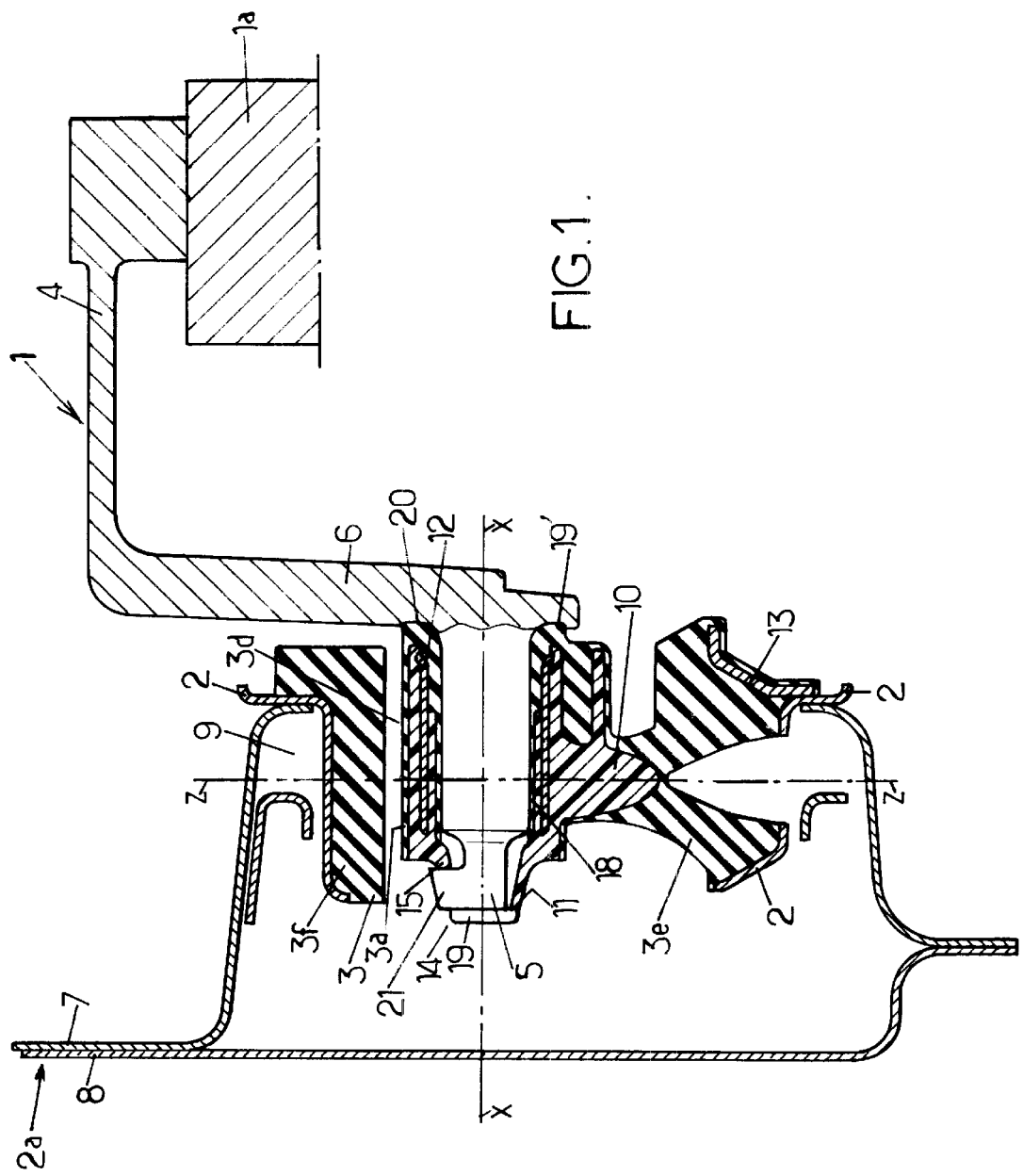
FIG. 1 is a view in section and in side elevation of an anti-vibration mounting as proposed by the invention.

For a preferred embodiment of the anti-vibration mounting proposed by the invention, particular reference should be made to FIGS. 1 and 2. This mounting comprises first and second rigid metal frames 1 and 2 which are joined to one another by an elastomer body 3 and which are designed to be inserted between two other rigid elements for damping and connection purposes.

The first frame 1, for example, is designed to be connected to a load to be supported, for example a power unit 1a of a motor vehicle.

In the example illustrated in the drawings, the first frame is in the form of a double angle bracket, each of the free ends 4, 5 of which projects perpendicularly relative to a part 6 positioned substantially parallel with the vertical direction Z in which the weight of the power unit 1a is applied.

The free end 4, for example, is a bracket joined to the power unit 1a, for example by screwing.

The other free end 5 of the first frame 1 forming a mounting bar, having a horizontal axis X, is joined to the second frame 2 by the elastomer body 3, said second frame being joined to the vehicle body 2a, in particular being screwed onto joined metal parts 7, 8 belonging to the body 2a. These joined parts 7, 8 are assembled with one another so as to form a compartment 9 to receive the second frame 2.

Clearly, the function fulfilled by each of the first and second frames 1 and 2 may be reversed without departing from the scope of the invention.

Furthermore, the elastomer body 3 is a substantially annular member surrounding the axis X and is moulded and bonded onto the second frame 2, optionally clamping a reinforcing insert 13.

In addition, on a level with a zone that is globally annular 3a, the elastomer body 3 is moulded and bonded onto a central sleeve 10 made from a plastics material, inside which the mounting bar 5 belonging to the first frame 1 fits. This zone 3a forms two opposite bosses 3b, which co-operate by abutting with the interior of the second frame 2 to restrict displacement of the first frame 1 relative to the second frame 2 in a direction perpendicular to the axes X and Z.

Although substantially annular in profile, the elastomer body 3 has various special design features. For example, its bottom annular part 3a is separated from an outer annular part 3c by a slit 3d, except on a level with a bell-shaped bottom support part 3e linking parts 3a and 3c to one another.

Similarly, in order to restrict upward displacement between the first frame 1 and the second frame 2 along the axis Z, the outer part 3c of the elastomer body 3 is fitted with a stop 3f in a zone opposite the part 3e.

By virtue of one feature of the invention, on a level with an end 14 positioned facing parts 7, 8 mentioned above, the sleeve 10 has a first connection means 15 comprising a zone of a truncated cone shape, for example, provided with a plurality of flexible tabs 16, of which there are three in particular and advantageously four.

Furthermore, a ridge 21 manufactured in one piece with the mounting bar 5 is provided between each flexible tab 16. Each of the ridges projects perpendicularly to the longitudinal axis of the sleeve and fits between two contiguous tabs 16, preventing any rotary movement between the first and the second frame.

Moreover, in accordance with another feature of the invention, the mounting bar 5 of the first frame 1 has a second connection means 19, matching the first means 15 and co-operating with it in a clip-fit mechanism (i.e. by an elastic gripping action). This second connection means 19 comprises a shoulder or relief, for example, projecting out radially relative to the axis X.

Because of the nature of the mechanical properties afforded by the material from which the sleeve 10 is made and the geometric conformation of the first connection means 15, the tabs 16 may be displaced radially as the mounting bar 5 penetrates the sleeve 10. Once the shoulder 19 has moved past the tip of the region of the truncated cone shape formed by the first connection means 15, the flexible tabs 16 resume their initial positions and move to bear, in a zone 11, on the wall of the relief 19, thereby restricting any displacement in translation along the axis X of the end of the mounting bar 5 of the first frame 1 relative to the body 3 in the uncoupling direction.

In the reverse direction, any movement of the frame 1 in translation relative to the body 3 is checked by a shoulder 19=formed between the mounting bar 5 and the part 6 of the frame 1 which moves into contact with a front wall 20 of the body 3.

In order to ensure correct positioning, the shoulder 19=is made from rubber, which is compressed during mounting and acts as a spring.

By virtue of yet another characteristic of the invention, the sleeve 10 is reinforced by a tubular metal insert 12, partially embedded in the plastics material of the sleeve 10.

Similarly, the periphery of the elastomer body 3 may advantageously be reinforced in full or in part by one or more rigid inserts 13, in particular of metal, which may optionally be surrounded by the second frame 2.

The invention described above offers a number of advantages: in practice, the clip-fit connection between the two frames enables normal manufacturing tolerances to be retained, which prevents any uncoupling whilst reconciling the manufacturing and design requirements for an anti-vibration mounting comprising a reduced number of parts and costing less.

Clearly, the invention is not restricted to the examples of embodiments described and illustrated above. On the contrary, it encompasses all embodiments.

We claim:

1. An anti-vibration mounting comprising first and second rigid frames intended to be joined respectively to two rigid elements to damp vibrations between these two elements, an elastomer body linking the two frames to one another and supporting a permanent axial load along a vertical axis, the elastomer body being joined to a sleeve fitted on a mounting bar belonging to the first frame and extending along a horizontal axis substantially perpendicular to the vertical axis, the mounting bar also supporting the permanent axial load, wherein the sleeve is retained on the mounting bar by a clip-fit connection.

2. An anti-vibration mounting as claimed in claim 1, wherein the sleeve has an end piece of a truncated cone shape provided with a plurality of flexible tabs which clip onto the mounting bar.

3. An anti-vibration mounting wherein the sleeve has an end piece of a truncated cone shape provided with a plurality of flexible tabs which clip onto the mounting bar as claimed in claim 1, wherein the free ends of the flexible tabs abut against a relief projecting radially relative to the mounting bar.

4. An anti-vibration mounting as claimed in claim 1, wherein there are at least three flexible tabs.

5. An anti-vibration mounting as claimed in claim 1, wherein there are four flexible tabs.

6. An anti-vibration mounting as claimed in claim 1, wherein the sleeve is made from a plastics material.

7. An anti-vibration mounting as claimed in claim 1, wherein the sleeve is reinforced by a metal insert.

8. An anti-vibration mounting as claimed in claim 1, wherein the elastomer body has some zones forming stops along the first axis and in a direction perpendicular to the first and second axes in order to restrict the extent of relative movement between the first and second frames.

9. An anti-vibration mounting as claimed in claim 1, wherein, the elastomer body is surrounded by the second frame.

10. An anti-vibration mounting as claimed in claim 1, wherein a ridge manufactured in one piece with the mounting bar fits between each flexible tab, preventing any rotary movement between the first and second frames.

11. A motor vehicle comprising an engine connected to a body by at least one anti-vibration mounting comprising first and second rigid frames intended to be joined respectively to two rigid elements to damp vibrations between these two elements, an elastomer body linking the two frames to one another and supporting a permanent axial load along a first axis, the elastomer body being joined to a sleeve fitting on a mounting bar belonging to the first frame and extending along a second axis substantially perpendicular to the first axis, wherein the sleeve is retained on the mounting bar by a clip-fit connection and the mounting bar also supports the permanent axial load, the first axis being vertical and the second axis being horizontal.

* * * * *